United States Patent
Gallatin

(10) Patent No.: US 12,375,462 B2
(45) Date of Patent: Jul. 29, 2025

(54) TECHNIQUES FOR MITIGATING NIC kTLS DENIAL-OF-SERVICE ATTACKS

(71) Applicant: NETFLIX, INC., Los Gatos, CA (US)

(72) Inventor: Andrew John Gallatin, Richmond, VA (US)

(73) Assignee: NETFLIX, INC., Los Gatos, CA (US)

( * ) Notice: Subject to any disclaimer, the term of this patent is extended or adjusted under 35 U.S.C. 154(b) by 347 days.

(21) Appl. No.: 17/878,757

(22) Filed: Aug. 1, 2022

(65) Prior Publication Data
US 2024/0039902 A1   Feb. 1, 2024

(51) Int. Cl.
*H04L 9/40* (2022.01)
*H04L 69/16* (2022.01)

(52) U.S. Cl.
CPC ...... *H04L 63/0485* (2013.01); *H04L 63/1458* (2013.01); *H04L 63/166* (2013.01); *H04L 69/16* (2013.01)

(58) Field of Classification Search
CPC .... H04L 63/0485; H04L 69/16; H04L 69/166
See application file for complete search history.

(56) References Cited

U.S. PATENT DOCUMENTS

| 2010/0085987 | A1* | 4/2010 | Kamata | H04W 28/06 370/477 |
|---|---|---|---|---|
| 2018/0278583 | A1 | 9/2018 | Cela | |
| 2019/0116127 | A1* | 4/2019 | Pismenny | H04L 63/0272 |
| 2020/0236140 | A1* | 7/2020 | Srinivasan | H04L 5/0055 |
| 2021/0117360 | A1* | 4/2021 | Kutch | G06F 3/0656 |

OTHER PUBLICATIONS

International Search Report for PCT Application No. PCT/US2023/070638 dated Oct. 17, 2023.
Looney, Jonathan, "Netflix: Streaming Entertainment to 200 Million Members Around the World", XP061054475, Feb. 23, 2021, 29 pages.
Petter et al., "Kernel TLS and hardware TLS offload in FreeBSD 13", Sep. 22, 2019, 30 pages.
Zolotukhin et al., "Data Mining Approach for Detection of DDoS Attacks Utilizing SSL/TLS Protocol", DOI: 10.1007 /978-3-319-23126-6-25, Aug. 13, 2015, pp. 274-285.

* cited by examiner

*Primary Examiner* — David R Lazaro
*Assistant Examiner* — Xiang Yu
(74) *Attorney, Agent, or Firm* — Artegis Law Group, LLP

(57) ABSTRACT

In various embodiments, a kernel uses a NIC to transmit encrypted data over TCP connections. The kernel causes the NIC to encrypt first data to generate a first transmission control protocol (TCP) packet in accordance with a hardware-based transport layer security (TLS) offload mode. The kernel computes a first re-transmission statistic in response to the first TCP packet failing to reach a first device over a first TCP connection; the kernel assigns the first TCP connection to a software-based TLS offload mode instead of the hardware-based TLS offload mode based on the first re-transmission statistic. Subsequently, the kernel encrypts second data to generate a second TCP packet in accordance with the software-based TLS offload mode, the kernel then causes the NIC to transmit the second TCP packet to the first device over the first TCP connection.

20 Claims, 3 Drawing Sheets

TECHNIQUES FOR MITIGATING NIC kTLS DENIAL-OF-SERVICE ATTACKS

BACKGROUND

Field of the Various Embodiments

The various embodiments relate generally to computer networking and network security and, more specifically, to techniques for mitigating NIC kTLS denial-of-service attacks.

DESCRIPTION OF THE RELATED ART

A typical streaming media service provides access to a library of media titles that can be viewed on a range of different client devices. In many implementations, to access a given media title, a client application executing on a client device opens a Transmission Control Protocol (TCP) connection to a media delivery application executing on a server device. The TCP connection provides reliable and in-order delivery of data in both directions using TCP packets." Notably, in order to provide reliable data delivery, TCP implementations are configured to detect lost TCP packets and then re-transmit those TCP packets once detected.

After a TCP connection has been opened, a client application oftentimes also establishes a transport layer security (TLS) session with the media delivery application. The TLS session enables end-to-end secure delivery of data over the TCP connection while protecting user privacy. To deliver data during a TLS session, the data is encrypted and optionally authenticated to generate TLS records. The TLS records are then partitioned into TCP segments, and each TCP segment is encapsulated within a different TCP packet for transmission over the associated TCP connection.

In one approach to generating TLS records, data is encrypted using a kernel that runs on a processor of the server device. The kernel first executes one or more direct memory access (DMA) operations to copy data from non-volatile disk storage to volatile "system" memory that is allocated to the associated processor. Subsequently, the kernel reads the data from system memory and splits the data into different data fragments. The kernel encrypts and optionally authenticates each data fragment to generate a corresponding TLS record. After generating a TLS record, the kernel writes the TLS record back to system memory, partitions the TLS record into any number of TCP segments, and encapsulates each TCP segment within a different TCP packet. A network interface controller (NIC) copies each TCP packet from the system memory for transmission over the associated TCP connection.

One drawback of this approach (referred to herein as "software-based TLS offload" and "software kernel TLS (kTLS)") is that generating and encrypting the TLS records can consume substantial amounts of processing resources and system memory bandwidth. As used herein, "system memory bandwidth" refers to the rate at which system memory can be accessed by a processor or a peripheral device using DMA. As a result, software kTLS can substantially reduce the overall performance of the server device, thereby decreasing the amount of network traffic the server device can service.

In another approach to generating TLS records, TLS data encryption is offloaded from a processor to a NIC that is capable of encrypting and optionally authenticating data while transmitting TCP packets over TCP connections. In some implementations, the kernel generates "plaintext" TLS records that encapsulate unencrypted data instead of encrypted data. After generating a plaintext TLS record, the kernel writes the plaintext TLS record back to system memory, partitions the plaintext TLS record into any number of plaintext TCP segments, and encapsulates each plaintext TCP segment within a different plaintext TCP packet. A NIC copies each plaintext TCP packet from the system memory via DMA, encrypts the unencrypted data encapsulated in the plaintext TCP segment corresponding to the plaintext TCP packet to generate a TCP packet, and then transmits the TCP packet over the associated TCP connection. Importantly, the amount of processing resources and system memory bandwidth consumed by this particular approach (referred to herein as "hardware-based TLS offload," "NIC kTLS," and "hardware inline kTLS") can be substantially reduced relative to the amount of processing resources and system memory bandwidth consumed by a software kTLS approach.

One drawback of NIC kTLS, though, is that to re-transmit a lost TCP packet, the NIC needs to read from system memory the portion of the plaintext TLS record up to and including the plaintext TCP segment encrypted and encapsulated in the lost TCP packet in order to recreate the proper encryption state. Because the loss of a single TCP packet can cause a NIC to read and re-encrypt an entire plaintext TLS record, NIC kTLS is susceptible to a particular type of denial-of-service (DoS) attack where an attacker repeatedly fakes losing TCP packets that correspond to TCP segments near or at the end of TLS records across multiple TLS sessions. This type of attack effectively forces a NIC to re-read and re-encrypt entire plaintext TLS records, which can substantially reduce the bus bandwidth between the NIC and the system memory.

As the foregoing illustrates, what is needed in the art are more effective techniques for generating TLS records when transmitting TCP packets over a TCP connection.

SUMMARY

One embodiment of the present invention sets forth a computer-implemented method for encrypting data for transmission, The method includes causing a network interface controller (NIC) to encrypt first data to generate a first transmission control protocol (TCP) packet in accordance with a hardware-based transport layer security (TLS) offload mode; computing a first re-transmission statistic in response to the first TCP packet failing to reach a first device over a first TCP connection; assigning the first TCP connection to a software-based TLS offload mode instead of the hardware-based TLS offload mode based on the first re-transmission statistic; encrypting second data to generate a second TCP packet in accordance with the software-based TLS offload mode; and causing the NIC to transmit the second TCP packet to the first device over the first TCP connection.

At least one technical advantage of the disclosed techniques relative to the prior art is that, with the disclosed techniques, TLS records can be generated efficiently when transmitting TCP packets over a TCP connection while also mitigating the risk of DoS attacks. In this regard, because TLS data encryption is offloaded from software to a NIC, unless a maximum re-transmit threshold is exceeded, the amount of processing resources and system memory bandwidth consumed using the disclosed techniques can be reduced relative to software kTLS. Further, because TLS data encryption is automatically moved from the NIC to software when a maximum re-transmit threshold is exceeded, the overall risk posed by DoS attacks is reduced relative to NIC kTLS. These technical advantages provide one or more technological advancements over prior art approaches.

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are denoted with reference numbers identifying the object and parenthetical alphanumeric character(s) identifying the instance where needed.

BRIEF DESCRIPTION OF THE DRAWINGS

So that the manner in which the above-recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
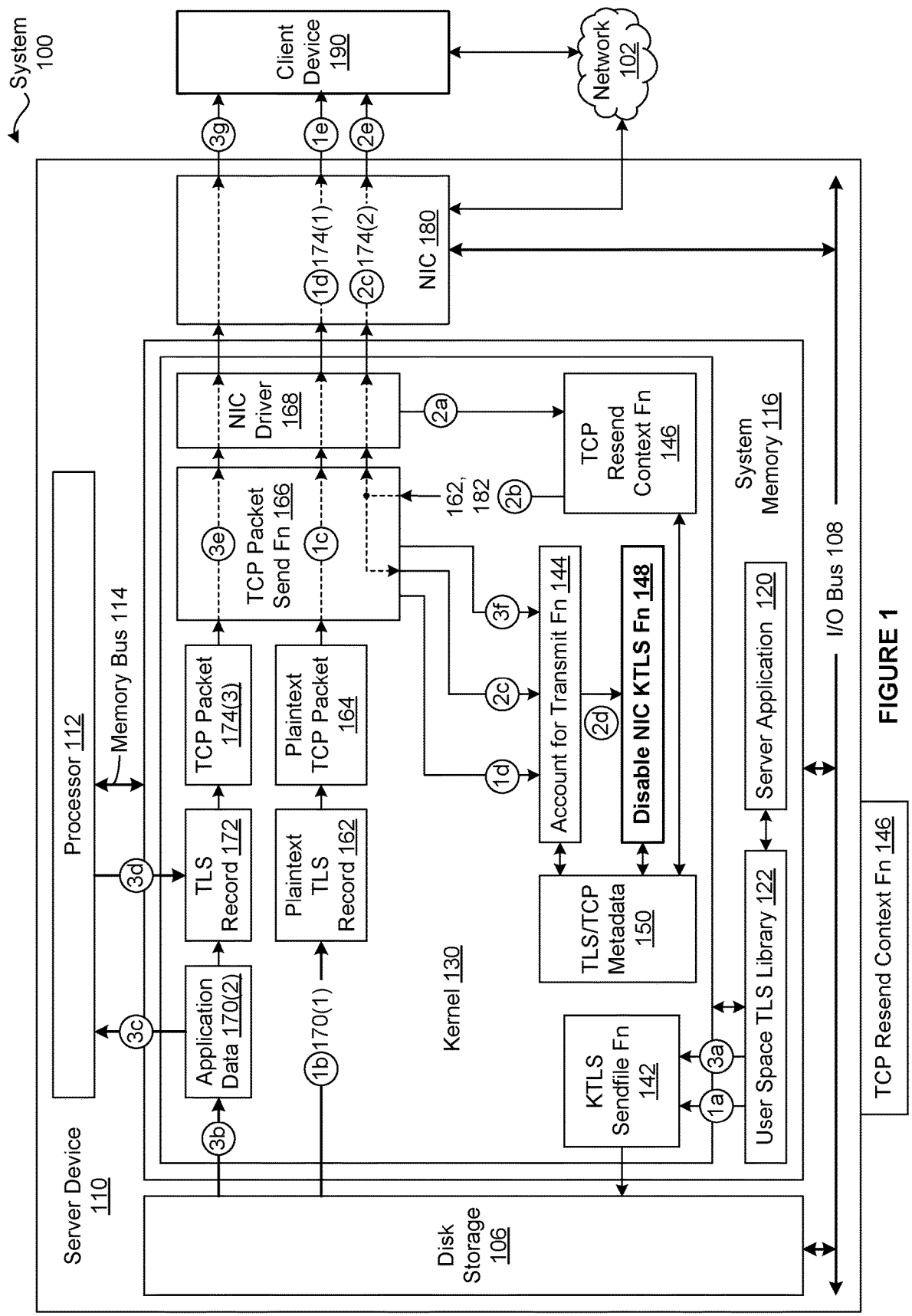
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

To enable a library of media titles to be efficiently delivered to different client devices under a wide range of network conditions, a typical streaming media service stores multiple, pre-generated, encoded versions of each available media title across a content delivery network (CDN). To playback a media title on a client device, a client application executing on a client device opens a TCP connection to a server application executing on a server in the CDN. In order to provide reliable data delivery, TCP implementations are configured to transmit data via TCP packets, detect lost TCP packets and re-transmit the data associated with lost TCP packets once detected.

After a TCP connection has been opened, a client application oftentimes also establishes a TLS session with the server application. To provide end-to-end secure delivery of data over the TCP connection while protecting user privacy during a TLS session, the data is encrypted and optionally authenticated to generate TLS records. The TLS records are then partitioned into TCP segments, and each TCP segment is encapsulated within a different TCP packet for transmission over the associated TCP connection.

In a software kTLS approach to encrypting data for transmission over a TCP connection, a kernel that runs on a processor of a server device copies the data from non-volatile disk storage to volatile system memory. Subsequently, the kernel reads the data from system memory, encrypts the data to generate encrypted data, writes the encrypted data back to system memory, and generates one or more TLS records that collectively specify the encrypted data. For each TLS record, the kernel generates one or more TCP packets. A NIC copies each TCP packet from system memory for transmission over the associated TCP connection. One drawback of software kTLS is that generating the TLS records can consume substantial amounts of processing resources and system memory bandwidth. As a result, software kTLS can substantially reduce the overall performance of the server device, thereby decreasing the amount of network traffic the server device can service.

In a NIC kTLS approach to encrypting data for transmission over a TCP connection, TLS data encryption is off-loaded from a processor to a NIC that is capable of encrypting and optionally authenticating data while transmitting TCP packets over TCP connections. In some implementations, a kernel that runs on the processor copies data from disk storage to system memory and generates one or more plaintext TLS records that collectively specify the data, for each plaintext TLS record, the kernel generates one or more plaintext TCP packets that each encapsulate a different plaintext TCP segment of the plaintext TLS record. The NIC reads each plaintext TCP packet from the system memory, encrypts the plaintext TCP segment encapsulated in the plaintext TCP packet to generate a TCP packet, and then transmits the TCP packet over the associated TCP connection. Importantly, the amount of processing resources and system memory bandwidth consumed by NIC kTLS can be substantially reduced relative to the amount of processing resources and system memory bandwidth consumed by software kTLS.

One drawback of NIC kTLS, though, is that to re-transmit a lost TCP packet, the NIC needs to read from system memory the portion of the plaintext TLS record up to and including the plaintext TCP segment encrypted and encapsulated in the lost TCP packet in order to recreate the proper encryption state. Because the loss of a single TCP packet can cause a NIC to read and re-encrypt an entire plaintext TLS record, NIC ktLS can exacerbate negative impacts of lossy data TCP connections on memory bandwidth and is susceptible to "fake packet loss" DoS attacks. In a fake packet loss DoS attack, an attacker repeatedly fakes losing TCP packets that correspond to TCP segments near or at the end of TLS records across multiple TLS sessions.

More specifically, in NIC kTLS, because the NIC often is forced to re-read and re-encrypt multiple TCP segments to re-transmit a single lost TCP packet, the bus bandwidth between the NIC and system memory can be substantially reduced. For example, if each TLS record is split into sixteen TCP segments, then the NIC would have to re-read and re-encrypt as much as sixteen times the amount of data originally carried by a lost TCP packet in order to re-transmit the data. Relative to re-reading and re-encrypting only a single TCP segment that is actually carried by a lost TCP packet, a typical lossy TCP connection can reduce the bandwidth between a NIC and system memory by an average factor of eight, and a DoS attack can reduce the bandwidth between a NIC and system memory by a factor of sixteen. An attacker could therefore launch a 16:1 DoS amplification attack across many TLS sessions that would effectively reduce a 200 Gigabits per second (Gbs) NIC to a 12.5 Gb/s NIC.

With the disclosed techniques, however, if a kernel is offloading TLS data encryption to a NIC for a TLS session and a corresponding TCP connection has an excessive re-transmission rate, then the kernel ceases to offload TLS data encryption to the NIC for the TLS session. In some embodiments, a configurable NIC kTLS maximum packet-based re-transmission rate and/or a configurable NIC kTLS maximum byte-based re-transmission rate are set to values that are indicative of a DoS attack that fakes TCP packet loss and/or a TCP connection with a excessive amount of packet loss.

As part of initializing each TLS session, a kernel executing on a processor in a server device sets a TLS mode for the TLS session to a NIC kTLS mode. When a TLS session is in the NIC kTLS mode, the kernel offloads TLS data encryption for sends within the TLS session to an associated NIC. Whenever the server device sends data over a TCP connection within a TLS session that is in the NIC kTLS mode, the kernel automatically updates any amount of tracking data associated with both the TCP connection and the TLS session. In particular, in some embodiments, the kernel updates a count of TCP packets used to transmit data over the TCP connection and/or a total number of data bytes transmitted over the TCP connection.

Whenever the server device resends data over a TCP connection within a TLS session that is in the NIC kTLS mode, the kernel automatically updates any amount of tracking data associated with both the TCP connection and the TLS session and then computes one or more re-transmission statistics to determine whether to continue to offload TLS data encryption to the NIC for the TLS session. More specifically, in some embodiments, the kernel updates a count of TCP packets used to re-transmit data over the TCP connection and/or a total number of data bytes re-transmitted over the TCP connection. The kernel then computes a packet-based re-transmission rate for the TLS session and/or a byte-based re-transmission rate for the TLS session based on the tracking data associated with the TLS session.

If the packet-based re-transmission rate for a TLS session exceeds the NIC kTLS maximum packet-based re-transmission rate and/or the byte-based re-transmission rate for the TLS session exceeds the NIC kTLS maximum byte-based re-transmission rate, then the kernel sets the TLS mode for the TLS session to a software kTLS mode instead of the NIC kTLS mode. When a TLS session is in the software kTLS mode, the kernel performs TLS data encryption for sends within the TLS session.

At least one technical advantage of the disclosed techniques relative to the prior art is that, with the disclosed techniques, TLS records can be generated efficiently when transmitting TCP packets over a TCP connection while also mitigating the risk of DoS attacks and optionally reducing the negative impacts of lossy TCP connections. In this regard, because the kernel offloads TLS data encryption from the kernel to a NIC, unless a maximum re-transmit threshold is exceeded, the amount of processing resources and system memory bandwidth consumed can be reduced relative to software kTLS. Further, because the kernel automatically moves TLS data encryption from the NIC to the kernel when a maximum re-transmit threshold is exceeded, the overall risk posed by DoS attacks and optionally the negative impact of lossy TCP connections are reduced relative to NIC kTLS. These technical advantages provide one or more technological advancements over prior art approaches.

System Overview

In the following description, numerous specific details are set forth to provide a more thorough understanding of the various embodiments. However, it will be apparent to one skilled in the art that the inventive concepts may be practiced without one or more of these specific details.

FIG. 1 is a conceptual illustration of a system 100 configured to implement one or more aspects of the various embodiments. As shown, in some embodiments, the system 100 includes, without limitation, a server device 110, a client device 190, and a network 102. In the same or other embodiments, the system 100 can include, without limitation, any number of other server devices, any number of other client devices, any number of other networks, or any combination thereof.

It will be appreciated that the core architecture including the connection topology of the system 100 and the server device 110 described herein is illustrative and that many variations and modifications are possible without departing from the broader spirit and scope of the invention. Further, in some embodiments, one or more components shown in FIG. 1 may not be present and/or any number of other components may be present, and the techniques described herein are modified accordingly.

Any number of the components of the system 100 can be distributed across multiple geographic locations or implemented in one or more cloud computing environments (i.e., encapsulated shared resources, software, data, etc.) in any combination. In some embodiments, the server device 110, any number of other server devices, the client device 190, any number of other server devices, or any combination thereof can be implemented in a cloud computing environment, implemented as part of any other distributed computing environment, or implemented in a stand-alone fashion.

In some embodiments, the client device 190 can be any type of device that is capable of executing instructions, supports TLS and TCP, and is capable of communicating with the server device 110 over the network 102. In the same or other embodiments, the network 102 is the Internet. In some embodiments, the client device 190 is or is integrated into a user device. Some examples of user devices include, without limitation, desktop computers, laptops, smartphones, smart televisions, game consoles, tablets, etc.

In some embodiments, the server device 110 can be any type of device that is capable of executing instructions, supports kTLS and TCP, and is capable of communicating with the client device 190 over the network 102. In the same or other embodiments, the server device 110 is capable of communication with any number of other client devices over the network 102 and/or any number of other networks.

As shown, in some embodiments, the server device 110 includes, without limitation, a processor 112, a system memory 116, a memory bus 114, disk storage 106, and a NIC 180. In the same or other embodiments, the server device 110 can include, without limitation, any number of other processors, any number and/or types of other memories, any number and/or types of other storage, any number and/or types of other NICs, or any combination thereof.

The processor 112 can be any instruction execution system, apparatus, or device capable of executing instructions. For example, the processor 112 could comprise a central processing unit, a graphics processing unit, a controller, a microcontroller, a state machine, or any combination thereof. The system memory 116 of the server device 110 stores content, such as a kernel, any number of software applications and data, for use by the processor 112 of the server device 110. In some embodiments, the system memory 116 can include, without limitation, any number and/or types of volatile memories capable of storing data and software applications, such as a random access memory (RAM).

In some embodiments, the server device 110 can include, without limitation, any number and/or types of other processors instead of or in addition to the processor 112. In the same or other embodiments, the server device 110 can include, without limitation, any number and/or types of other memories instead of or in addition to the system memory 116. In some embodiments, the server device 110 and any number and/or types of other devices (e.g., other server devices) can provide any number of multiprocessing environments in any technically feasible fashion.

The disk storage 106 provides non-volatile storage for applications and data that is accessible to the server device 110. In some embodiments, the disk storage 106 includes, without limitation, any number and/or types of fixed or removable hard disk drives. solid state drives, flash memory devices, compact disc read-only-memory, digital versatile disc read-only-memory, Blu-ray, high definition digital versatile disc, or other magnetic, optical, or solid state storage devices.

The NIC 180 can be any type of hardware component that enables the server device 110 to connect to the client device 190 over the network 102 and supports at least a NIC kTLS mode and a software kTLS mode for transmit. A software kTLS mode is also commonly referred to as a "software-based TLS offload mode," a "software crypto mode," and "software kTLS." A NIC kTLS mode is also commonly referred to as a "hardware-based TLS offload mode," an "inline hardware kTLS offload mode," and NIC kTLS.

As referred to herein, when operating in accordance with a software kTLS mode, a kernel 130 that resides in the system memory 116 and executes on the processor 112 performs TLS data encryption. By contrast, when operating in accordance with a NIC kTLS mode for transmit, the kernel 130 offloads TLS data encryption and optionally any number and/or types of other TLS or TCP operations to the NIC 180. Some examples of other TLS or TCP operations that the kernel 130 can offload to the NIC 180 include, without limitation, checksum computation for authentication, and TCP segmentation.

As described in greater detail below, to support NIC kTLS mode for transmit in some embodiments, the NIC 180 performs TLS data encryption and any number and/or types of other offloaded TLS or TCP operations "inline" or as the NIC 180 transmits TCP packets over TCP connections. The NIC 180 can be installed on the server device 110 in any technically feasible fashion.

The processor 112, the disk storage 106, and the NIC 180 are each connected to the system memory 116 in any technically feasible fashion. As shown, in some embodiments, the processor 112 is connected to the system memory 116 via, without limitation, a memory bus 114. In the same or other embodiments, the disk storage 106, the NIC 180, and the system memory 116 are interconnected via, without limitation, an input/output (I/O) bus 108. The memory bus 114 and the I/O bus 108 can be implemented using any technically suitable protocols, including, without limitation, Peripheral Component Interconnect Express (PCIe). Accelerated Graphics Port (AGP), HyperTransport, or any other bus or point-to-point communication protocol known in the art.

In some embodiments, the processor 112, the disk storage 106, and the NIC 180 can each be connected to the system memory 116 via without limitation, any number and/or types of other buses, any number and/or types of controllers (e.g., memory controllers, I/O controllers), any number and/or types of bridges, any number and/or types of switches, or any combination thereof instead of or in addition to the memory bus 114 and/or the I/O bus 108. For instance, in some embodiments, the memory bus 114 and the I/O bus 108 are replaced with any number of PCIe switches and a PCIe bus that interconnects the processor 112, the disk storage 106, the NIC 180, and the system memory 116.

Although not shown, in some embodiments, the server device 110 includes, without limitation, any number of direct memory access (DMA) controllers that enable the NIC 180, the disk storage 106, any number of other components of the server device 110, or any combination thereof to read from and write to the system memory 116 without involving the processor 112. For instance, in some embodiments, a DMA controller included in the NIC 180 enables the NIC 180 to read from and write to the system memory 116 via DMA. In the same or other embodiments, a DMA controller included in the disk storage 106 enables the disk storage 106 to read from and write to the system memory 116 via DMA.

In general, the server device 110 is configured to provide access to data that is stored in the disk storage 106 to any number and/or types of client applications executing on any number and/or types of client devices via any number of TLS sessions executing over any number of TCP connections. For instance, in some embodiments the server device 110 provides streaming access to encoded videos that reside in the disk storage 106 via TLS sessions that are associated with TCP connections to enable corresponding media titles to be viewed on a range of different client devices.

In some embodiments, each TLS session is associated with either a transmit side of a TCP connection or a receive side of a TCP connection with respect to the server device 110. In the same or other embodiments, the server device 110 provides data to client devices over TLS sessions associated with transmit sides of corresponding TCP connections. For explanatory purposes, a TLS session that is associated with a transmit side of a TCP connection is also referred to herein as a "TLS transmit session."

As described previously herein, some conventional server devices implement software kTLS to deliver data to a client device. In a typical implementation of software kTLS, a kernel copies data from disk storage to system memory via DMA and then reads the data from system memory. The kernel encrypts and optionally authenticates the data to generate one or more TLS records. After generating a TLS record, the kernel writes the TLS record back to system memory and generates one or more TCP packets that each encapsulate a different TCP segment of the TLS record. A NIC copies each TCP packet from the system memory via DMA and then transmits the TCP packet over an associated TCP connection. One drawback of software kTLS software kernel is that encrypting the data can consume substantial amounts of processing resources and system memory bandwidth. As a result, software kTLS can substantially reduce the overall performance of the server device, thereby decreasing the amount of network traffic the server device can service.

As also described previously herein, some conventional server devices implement NIC kTLS to deliver data to a client device. In a typical implementation of NIC kTLS, a kernel copies data from disk storage to system memory via DMA and generates one or more plaintext TLS records that each encapsulate a different fragment of the data. After generating a plaintext TLS record, the kernel writes the plaintext TLS record back to system memory and generates one or more plaintext TCP packets that each encapsulate a different plaintext TCP segment of the TLS record. A NIC copies each plaintext TCP packet from the system memory via DMA, encrypts the unencrypted data encapsulated in the plaintext TCP segment corresponding to the plaintext TCP packet to generate a TCP packet, and then transmits the TCP packet over the associated TCP connection.

One drawback of NIC kTLS, though, is that to re-transmit a lost TCP packet, the NIC needs to read from system memory the portion of the plaintext TLS record up to and including the plaintext TCP segment encrypted and encapsulated in the lost TCP packet in order to recreate the proper encryption state. Accordingly, NIC kTLS is susceptible to a particular type of denial-of-service (DoS) attack where an attacker repeatedly fakes losing TCP packets to force a NIC to re-read and re-encrypt entire plaintext TLS records, which can substantially reduce the bus bandwidth between the NIC and the system memory.

Moving TLS Data Encryption from a NIC to a Kernel to Mitigate Excessive Re-Transmission Rates To address the above problems, in some embodiments, the kernel 130 implements a "provisional NIC encryption" approach to implementing the kTLS protocol. In provisional NIC encryption kTLS, the kernel 130 initially offloads TLS data encryption for each new TLS transmit session to an NIC associated with the TLS transmit session. For each re-transmission of data or "resend" within a TLS session for which TLS data encryption is offloaded to a NIC, the kernel computes one or more re-transmission statistics to determine whether the TLS session is associated with an excessive re-transmission rate. If the kernel 130 determines that the TLS session is associated with an excessive re-transmission rate, then the kernel 130 ceases to offload TLS data encryption to the NIC for the TLS session. In some embodiments, after the kernel 130 ceases to offload TLS data encryption to the NIC for a TLS session, the kernel 130 performs TLS data encryption for data associated with new transmissions or "sends" within the TLS session.

Advantageously, because the kernel 130 offloads TLS data encryption for a TLS session to a NIC, unless the kernel 130 determines that the TLS session is associated with an excessive re-transmission rate, the amount of processing resources and system memory bandwidth consumed to serve the same amount of traffic can be reduced relative to software kTLS. Conversely, relative to software kTLS, the amount of traffic that the server device 110 is capable of serving can be increased. And because the kernel 130 automatically moves TLS data encryption for a TLS session from a NIC to software upon determining that the TLS session is associated with an excessive re-transmission rate, the overall risk posed by DoS attacks is reduced relative to conventional NIC kTLS.

Importantly, in some embodiments, a relatively poor TCP connection can be associated with an excessive re-transmission rate. Advantageously, the kernel 130 can automatically cease to offload TLS data encryption to the NIC for TLS sessions associated with poor TCP connections and therefore excessive re-transmission rates. As a result, the kernel 130 can mitigate the negative impact of client devices having relatively poor TCP connections to the server device 110 on other client devices and/or the amount of network traffic that the server device 110 can service.

For explanatory purposes, some techniques including some provisional NIC encryption techniques are described herein in the context of providing access to data that is stored in the disk storage 106 to the client device 190 within the system 100 via an exemplar TLS session that executes over the transmit side of an exemplar TCP connection using exemplar implementations of kTLS, a NIC kTLS mode, a software kTLS mode, and TCP. Note, however, that the functionality and techniques described herein are illustrative rather than restrictive and can be altered without departing from the broader spirit and scope of the invention.

In particular, many variations and modifications to the architecture including the connection topology and the functionality of the system 100 and the server device 110 are possible, and corresponding alterations to the techniques described herein will be apparent to those of ordinary skill in the art without departing from the scope and spirit of the described embodiments. For instance, in some embodiments, the techniques described herein can be modified to enable any number of client applications executing on any number of client devices to access data that is stored in any number and/or types of memories associated with any number and/or types of server applications executing on any number of server devices via any number of TLS sessions that operate over any number of TCP connections.

In some embodiments, the server device 110, any number of other server devices, the client device 190, any number of other client devices, or any combination thereof can execute any number of implementations of kTLS and any number of implementations of TCP, and the techniques described herein can be modified accordingly without departing from the scope and spirit of the described embodiments.

In general, the techniques described herein can be modified to automatically disable offloading of TLS data encryption and optionally any number and/or types of other TLS and/or TCP operations to one or more NICs for each of any number and/or types of TLS sessions based on any number and/or types of data associated with transmissions and/or re-transmissions within the TLS sessions without departing from the scope and spirit of the described embodiments.

As shown, in some embodiments, a server application 120, a user space TLS library 122, and the kernel 130 reside in the system memory 116 of the server device 110 and execute on the processor 112 of the server device 110. In some embodiments, the server application 120 can be any software application that executes in user space and transmits data stored in the disk storage 106 to a client application executing on the client devices 190 via TLS and TCP. In the same or other embodiments, the user space TLS library 122 establishes and manages TLS session(s) associated with any number of software applications (including the server application 120) that execute on the processor 112 of the server device 110.

Although not shown, in some embodiments, a client application executing on the client device 190 opens a TCP connection to the server application 120. The TCP connection provides reliable and in-order delivery of data in both directions using TCP packets. Notably, in order to provide reliable data delivery, TCP implementations are configured to detect lost TCP packets and then resend those TCP packets once detected. After the TCP connection has been opened, the client application establishes at least one TLS session with the server application 120. In some embodiments, the server application 120 uses the user space TLS library 122 to complete a TLS handshake in user space and set up a TLS/TCP socket that allows the server application 120 to send data to the client application within the TLS session and over the TCP connection. Accordingly, the TLS session is associated with a transmit side of the TCP connection with respect to the server device 110. As shown, in some embodiments, the user space TLS library 122 can interact with the kernel 130.

In some embodiments, the kernel 130 implements, without limitation, any amount and/or types of TLS functionality, any amount and/or types of kTLS functionality, any amount and/or types of TCP functionality, and can configure and control provisional NIC encryption for each TLS transmit session in any technically feasible fashion. Some examples of operations that the kernel 130 can perform to configure and control provisional NIC encryption include, without limitation, offloading TLS data encryption for a TLS transmit session, ceasing to offload TLS data encryption for a TLS transmit session, performing any number and/or types of operations to compute any number and/or types of re-transmission statistics, and determining that a TLS transmit session is associated with an excessive re-transmission rate.

The kernel 130 can include, without limitation, any amount and/or types of data (including any amount and/or types of metadata), any number and/or types of functions, any number and/or types of drivers, and any amount and/or types of other software organized in any technically feasible fashion. As shown, in some embodiments, the kernel 130 includes, without limitation, TLS/TCP metadata 150, a kTLS sendfile function (fn) 142, a resend context function 146, a TCP packet send function 166, an account for transmit function 144, a disable NIC kTLS function 148, and a NIC driver 168.

In some embodiments, the kernel 130 stores any amount and/or types of data associated with TLS records and TCP packets as the kernel 130 handles the data for transmission within each TLS session and over each TCP connection. In the same or other embodiments, the kernel 130 determines and/or maintains any amount and/or types of the TLS/TCP metadata 150 to configure and control each TCP connection, each TLS session, and provisional NIC encryption for each TLS session. In some embodiments, the TLS/TCP metadata 150 includes, without limitation, any amount and/or type of shared TLS metadata that is applicable to each TLS session and a different session/connection state for any number of TLS sessions and the associated TCP connections.

In some embodiments, the shared TLS metadata includes, without limitation, one or more thresholds, limits, or other metadata that the kernel 130 uses to determine whether each TLS session for which TLS data encryption is offloaded to a NIC is associated with an excessive re-transmission rate. The kernel 130, any number of software applications, any number of components of the server device 110, or any combination thereof can determine and optionally update the shared TLS metadata in any technically feasible fashion.

As described in greater detail below in conjunction with FIG. 2, in some embodiments, the TLS/TCP metadata 150 includes, without limitation, a NIC kTLS threshold set. In some embodiments, the NIC kTLS threshold set includes, without limitation, one or more thresholds that the kernel 130 enforces for each TLS session for which TLS data encryption is offloaded to a NIC. In particular, in some embodiments, the NIC kTLS threshold set includes, without limitation, one or more "maximum re-transmit thresholds" that are different configurable definitions of excessive re-transmission rates for provisional NIC encryption.

For instance, in some embodiments, the NIC kTLS threshold set (not shown in FIG. 1) includes, without limitation, a configurable NIC kTLS maximum byte re-transmission percentage and a configurable maximum packet re-transmission via NIC kTLS percentage. The NIC kTLS maximum byte re-transmission percentage is a maximum percentage of re-transmitted data bytes of the total number of data bytes either transmitted or re-transmitted within a TLS session that the kernel 130 is to allow when TLS data encryption for the TLS session is offloaded to a NIC. The maximum packet re-transmission via NIC kTLS percentage is a maximum percentage of TCP packets used to re-transmit data within a TLS session of the total number of TCP packets used to either transmit or re-transmit data with the TLS session that the kernel 130 is to allow when TLS data encryption for the TLS session is offloaded to a NIC.

In some embodiments, the kernel 130 and/or one or more other components of the server device 110 can determine and optionally update any amount and/or types of data included in the NIC ktLS threshold set in any technically feasible fashion. For instance, in some embodiments, one or more maximum re-transmit thresholds are set to values that are indicative of a DoS attack that fakes packet loss in order to mitigate the risk of DoS attacks when implementing NIC kTLS. In the same or other embodiments, one or more maximum re-transmit thresholds are set to values that are indicative of excessively lossy connections in order to mitigate any negative impact of other, better connections and the overall performance of the server device 110. In some embodiments, the NIC kTLS threshold set is replaced or supplemented with any number and/or types of constraints or any other types of data that can be used to define excessive re-transmissions globally, per-session, per-connection, at any other granularity, or any combination thereof in any technically feasible fashion.

For each TLS session, the associated session/connection state can include, without limitation, any amount and/or types of data associated with implementing the TLS session, a TCP connection associated with the TLS session, software kTLS, NIC kTLS, provisional NIC encryption kTLS, or any combination thereof. For instance, in some embodiments, the NIC kTLS threshold set is replaced or supplemented with different NIC kTLS threshold sets that are included in the session/connection states for corresponding TLS sessions.

In some embodiments, the session connection state for a TLS transmit session includes, without limitation, a TLS mode (not shown in FIG. 1) and a transmit tracking dataset (not shown in FIG. 1). In the same or other embodiments, the TLS mode can be either a NIC kTLS mode or a software kTLS mode. In some embodiments, the kernel 130 can assign a TLS session to the NIC kTLS mode or the software KTLS mode in any technically feasible fashion instead of or in addition to setting the TLS mode. In some embodiments, instead of or in addition to assigning a TLS session to the NIC kTLS mode or the software KTLS mode, the kernel 130 can assign the associated TCP connection and/or the transmit side of the associated TCP connection to the NIC kTLS mode or the software KTLS mode, respectively.

In some embodiments, the transmit tracking dataset includes, without limitation, any amount and/or types of data that track any number of aspects of resends and optionally sends within the TLS session and over the associated TCP connection. As described in greater detail below in conjunction with FIG. 2, in some embodiments, the transmit tracking dataset associated with a TCP connection includes, without limitation, a count of TCP packets used to transmit data over the TCP connection via NIC kTLS, a total number of data bytes transmitted over the TCP connection, a count of TCP packets used to re-transmit data over the TCP connection via NIC kTLS, and a total number of data bytes re-transmitted over the TCP connection.

The kernel 130 and/or one or more other components of the server device 110 can initialize and optionally maintain the TLS mode, the transmit tracking dataset, and any amount (including none) and/or types of other session connection state for any number of TLS sessions in any technically feasible fashion. Notably, in some embodiments, as part of initializing the session connection state for a new TLS transmit session, the kernel 130 sets the TLS mode to NIC kTLS mode to configure the TLS transmit session to initially offload TLS data encryption to a NIC.

In some embodiments, the kTLS sendfile function 142 combines a sendfile system call and kTLS to transmit data from the disk storage 106 to a client application over a TCP connection without copying the data to user space memory (not shown) in the system memory 116. In some embodiments, in response to a kTLS sendfile function call associated with a TLS session that is in the NIC kTLS mode, the kTLS sendfile function 142 generates and submits one or more plaintext TCP packets to the NIC 180 via the TCP packet send function 166 and the NIC driver 168. In the same or other embodiments, in response to a kTLS sendfile function call associated with a TLS session that is in the software kTLS mode, the kTLS sendfile function 142 generates and submits one or more TCP packets to the NIC 180 via the TCP packet send function 166 and the NIC driver 168.

In some embodiments, the resend context function 146 is associated with a TLS session that is in the NIC kTLS mode and enables the NIC 180 to properly re-encrypt a "target" TCP segment that was carried in an encrypted form by a lost TCP packet. More specifically, in the same or other embodiments, the resend context function 146 identifies a target plaintext TCP packet that encapsulates the target TCP segment and a target TLS record to which the target TCP segment belongs. In some embodiments, the resend context function 146 then generates an encryption context that specifies, without limitation, the TCP segments making up the target TLS record up to and including the target TCP segment. In some other embodiments, the resend context function 146 generates an encryption context that specifies, without limitation, the TCP segments making up the target TLS record up to but not including the target TCP segment. In some embodiments, the resend context function 146 associates the encryption context with the target plaintext TCP packet in any technically feasible fashion. In the same or other embodiments, the resend context function 146 re-submits the target plaintext TCP packet along with the encryption context to the NIC 180 via the TCP packet send function 166 and the NIC driver 168.

In some embodiments, for each send and each resend over a TCP connection, the TCP packet send function 166 submits, without limitation, any number of TCP packets and/or any number of plaintext TCP packets that are optionally associated with encryption contexts to the NIC driver 168. The TCP packet send function 166 can submit, to the NIC driver 168, TCP packets, plaintext TCP packets, encryption contexts, and any amount and/or types of relevant data in any technically feasible fashion. In the same or other embodiments, for each send and each resend over a TCP connection, the TCP packet send function 166 automatically executes the account for transmit function 144.

Among many other things, the account for transmit function 144 updates any amount and/or types of state data and/or tracking data for the TCP connection, updates any amount and/or types of state data and/or tracking data for any TLS session associated with the TCP connection, and performs any number and/or types of checks and/or operations to enforce any number and/or types of constraints. In some embodiments, the account for transmit function 144 updates any amount and/or types of state data and/or tracking data for any number of TCP connections, any amount and/or types of state data and/or tracking data for any number of TLS sessions, any amount and/or types of other data, or any combination thereof.

Notably, in some embodiments, for each send and each resend, the account for transmit function 144 updates a transmit tracking dataset. Further, for each resend associated with a TLS session that is in the NIC kTLS mode, the account for transmit function 144 computes one or more re-transmission statistics based on the transmit tracking dataset to determine whether any of the re-transmissions statistics have passed an associated NIC kTLS transmission threshold. If any of the re-transmissions statistics have passed the associated NIC kTLS transmission threshold, then the account for transmit function 144 disables offloading of TLS data encryption to the NIC 180 for the TLS session.

In some embodiments, the kernel 130 can update any amount and/or types of tracking data, compute any number and/or types of re-transmission statistics, and perform any number and/or types of operations based on the tracking data, the re-transmission statistics, any number and/or types of thresholds, limits, or other constraints, or any combination thereof to determine whether to disable offloading of TLS data encryption to the NIC 180 for a TLS session.

In some embodiments, as part of sending a TCP packet over a TCP connection within a TLS session that is in the NIC kTLS mode, the kernel 130 updates any amount and/or types of tracking data associated with both the TLS session and the TCP connection in any technically feasible fashion. For instance, in some embodiments, the kernel 130 updates at least one of a count of TCP packets used to transmit data over the TCP connection or a total number of data bytes transmitted over the TCP connection based on the TCP packet.

In the same or other embodiments, as part of resending a TCP packet over a TCP connection within a TLS session that is in the NIC kTLS mode, the kernel 130 updates any amount and/or types of tracking data, computes any number and/or types of re-transmission statistics, and determines whether to disable NIC kTLS for the TLS session and therefore the TCP connection in any technically feasible fashion. For instance, in some embodiments, the kernel 130 updates at least one of a count of TCP packets used to re-transmit data over the TCP connection or a total number of data bytes re-transmitted over the TCP connection based on the TCP packet.

In the same or other embodiments, the kernel 130 computes at least one re-transmission statistic (e.g., a ratio or a percentage) for the TLS session based on at least one of the count of TCP packets used to transmit data over the TCP connection, the total number of data bytes transmitted over the TCP connection, the count of TCP packets used to re-transmit data over the TCP connection, or he total number of data bytes re-transmitted over the TCP connection. In some embodiments, the kernel 130 compares at least one re-transmission statistic to at least one re-transmission threshold to determine whether the NIC kTLS mode is to be disabled for the TLS session.

The account for transmit function 144 can disable offloading of TLS data encryption to the NIC 180 for a TLS session in any technically feasible fashion. As shown, in some embodiments, the account for transmit function 144 calls the disable NIC kTLS function 148 to disable offloading of TLS data encryption to the NIC 180 for a TLS session. An example pseudocode for the account for transmit function 144 implemented in some embodiments is described in greater detail below in conjunction with FIG. 2.

The disable NIC kTLS function 148 can disable offloading of TLS data encryption to the NIC 180 for a TLS session in any technically feasible fashion, in some embodiments, the disable NIC kTLS function 148 sets the TLS mode for the TLS session to a software kTLS mode instead of the NIC kTLS mode. As a result, the NIC 180 performs TLS data encryption for any previously initiated sends and any associated resends within the TLS session, while the kernel 130 performs TLS data encryption for any newly initiated sends and any associated resends within the TLS session.

In some embodiments, the NIC driver 168 can be any type of software that manages the operations of the NIC 180 for the kernel 130, the transfer of data between the disk storage 106 and the NIC 180, the transfer of metadata between the kernel 130 and the NIC 180, or any combination thereof.

For explanatory purposes, circles labeled 1a-1e depict an exemplar sequence of events associated with generating and sending a TCP packet 174(1) to the client device 190 within an exemplar TLS session while a TLS mode for the exemplar TLS session is a NIC kTLS mode. As depicted with the circle labeled 1a, the server application 120 calls the kTLS sendfile function 142 via the user space TLS library 122 to send application data 170(1) that is stored in the disk storage 106 to the client device 190 within the exemplar TLS session. In response, the kernel 130 executes the kTLS sendfile function 142.

More precisely, in some embodiments, the kernel 130 executes a sendfile system call to copy the application data 170(1) from the disk storage 106 to the system memory 116 via DMA (depicted with the circle labeled 1b). In the same or other embodiments, the kernel 130 splits the application data 170(1) into one or more plaintext fragments and generates a plaintext TLS record 162 that specifies, without limitation, the location of a first plaintext fragment of the application data 170(1) in the system memory 116. For explanatory purposes, although the kernel 130 can generate any number of other plaintext TLS records specifying any remaining plaintext fragments of the application data 170 (1), the other plaintext TLS records are neither depicted nor described herein.

In some embodiments, the kernel 130 splits the plaintext TLS record 162 into one or more plaintext TCP segments (not shown) and generates a plaintext TCP packet 164 that specifies, without limitation, a first plaintext TCP segment of the plaintext TLS record 162. For explanatory purposes, although the kernel 130 can generate any number of other plaintext TCP packets specifying any remaining plaintext TCP segments of the plaintext TLS record 162, the other plaintext TCP segments are neither depicted nor described herein.

As depicted with the circle labeled 1c, in some embodiments, the TCP packet send function 166 relays the plaintext TCP packet 164 to the NIC 180 via the NIC driver 168. In some embodiments, in response to receiving the plaintext TCP packet 164, the NIC 180 reads a corresponding portion of the application data 170(1) from the system memory 116 via DMA. As depicted with a first instance of the circle labeled 1d, the NIC 180 encrypts and optionally authenticates the first plaintext TCP segment of the corresponding portion of the application data 170(1) to generate the TCP packet 174(1).

As depicted with a second instance of the circle labeled 1d, in some embodiments, the TCP packet send function 166 executes the account for transmit function 144 to account for sending the TCP packet 174(1) within the exemplar TLS session and over an associated exemplar TCP connection. In the same or other embodiments, the account for transmit function 144 updates, without limitation, any number of items included in the transmit tracking dataset associated with the exemplar TLS session. As depicted with the circle labeled 1e, the NIC 180 transmits the TCP packet 174(1) over the exemplar TCP connection to the client device 190.

For explanatory purposes, the circles labeled 2a-2f depict an exemplar sequence of events that trigger the kernel 130 to change the TLS mode for the exemplar TLS session from NIC kTLS mode to software kTLS mode. Although not shown, a TCP packet carrying a last TCP segment of the first fragment of the application data 170(1) fails to reach the client device 190 over the exemplar TCP connection and is therefore a lost TCP packet in response, and as depicted with the circle labeled 2a, the NIC driver 168 in some embodiments calls the TCP resend context function 146 to obtain the plaintext TCP packet 164 corresponding to the lost TCP packet and an encryption context 182.

As described previously herein, in some embodiment, the plaintext TCP packet 164 encapsulates the last plaintext TCP segment of the first plaintext fragment of the application data 170(1). Accordingly, in some embodiments, the TCP resend context function 146 determines the encryption context 182 that specifies, without limitation, the first plaintext fragment of the application data 170(1). As depicted with the circle labeled 2b, in some embodiments, the TCP resend context function 146 re-submits the plaintext TCP packet 164 along with the encryption context 182 to the TCP packet send function 166.

In the same or other embodiments, the TCP packet send function 166 re-submits the plaintext TCP packet 164 along with the encryption context 182 to the NIC 180 via the NIC driver 168. In response, the NIC 180 in some embodiments reads the first plaintext fragment of the application data 170(1) from the system memory 116 via DMA. As depicted with a first instance of the circle labeled 2c, the NIC 180 encrypts and optionally authenticates the first plaintext fragment of the application data 170(1) to generate the TCP packet 174(2).

As depicted with a second instance of the circle labeled 2c, in some embodiments, the TCP packet send function 166 executes the account for transmit function 144 to account for resending the last fragment of the application data 170(1) via the TCP packet 174(2) within the exemplar TLS session and over the exemplar TCP connection to the client device 190. In the same or other embodiments, the account for transmit function 144 updates, without limitation, any number of items included in the transmit tracking dataset associated with the exemplar TLS session. The account for transmit function 144 computes one or more re-transmission statistics based on the transmit tracking dataset associated with the exemplar TLS session. For explanatory purposes, the account for transmit function determines that at least one of the re-transmission statistics has passed an associated NIC kTLS transmission threshold.

As depicted with a circle labeled 2d, in some embodiments, the account for transmit function 144 calls the disable NIC kTLS function 148 to disable offloading of TLS data encryption to the NIC 180 for the exemplar TLS session. Although not shown, in some embodiments, the disable NIC kTLS function 148 changes the TLS mode for the exemplar TLS session from NIC kTLS mode to software kTLS mode. As depicted with the circle labeled 2e, the NIC 180 transmits the TCP packet 174(2) over the exemplar TCP connection to the client device 190.

For explanatory purposes, circles labeled 3a-3g depict an exemplar sequence of events associated with generating and sending a TCP packet 174(3) to the client device 190 within the exemplar TLS session while the TLS mode for the exemplar TLS session is software kTLS. As depicted with the circle labeled 3a, the server application 120 calls the kTLS sendfile function 142 via the user space TLS library 122 to send application data 170(2) that is stored in the disk storage 106 to the client device 190 within the exemplar TLS session. In response, the kernel 130 executes the kTLS sendfile function 142.

More precisely, in some embodiments, the kernel 130 executes a sendfile system call to copy the application data 170(2) from the disk storage 106 to the system memory 116 via DMA (depicted with the circle labeled 3b). As depicted with the circle number 3c, in the same or other embodiments, the kernel 130 reads the application data 170(2) from the system memory 116. The kernel 130 encrypts the application data 170(2) to generate encrypted application data (not shown). As depicted with the circle labeled 3d, the kernel 130 writes the encrypted application data back to the system memory 116.

As shown, in some embodiments, the kernel 130 splits the encrypted application data into one or more fragments and generates a TLS record 172 that specifies, without limitation, the location of a first fragment of the encrypted application data in the system memory 116. For explanatory purposes, although the kernel 130 can generate any number of other TLS records specifying any remaining fragments of the encrypted application data, the other TLS records are neither depicted nor described herein.

In some embodiments, the kernel 130 splits the TLS record 172 into one or more TCP segments (not shown) and generates TCP packet 174(3) that specifies, without limitation, a first TCP segment of the TLS record 172. For explanatory purposes, although the kernel 130 can generate any number of other TCP packets specifying any remaining TCP segments of the TLS record 172, the other TCP segments are neither depicted nor described herein. As depicted with the circle labeled 3e, in some embodiments, the TCP packet send function 166 relays the TCP packet 174(3) to the NIC 180 via the NIC driver 168.

As depicted with the circle labeled 3f, in some embodiments, the TCP packet send function 166 executes the account for transmit function 144 to account for sending the TCP packet 174(3) within the exemplar TLS session and over the exemplar TCP connection. In the same or other embodiments, the account for transmit function 144 updates, without limitation, any number of items included in the transmit tracking dataset associated with the exemplar TLS session.

In some embodiments, in response to receiving the TCP packet 174(3), the NIC 180 reads the portion of the encrypted application data corresponding to the first TCP segment of the TLS record 172 from the system memory 116 via DMA and transmits the TCP packet 174(3) over the exemplar TCP connection to the client device 190 (depicted with the circle labeled 3g).

Detecting Excessive Transmission Rates for a TLS Session in NIC KTLS Mode

Figure 2:
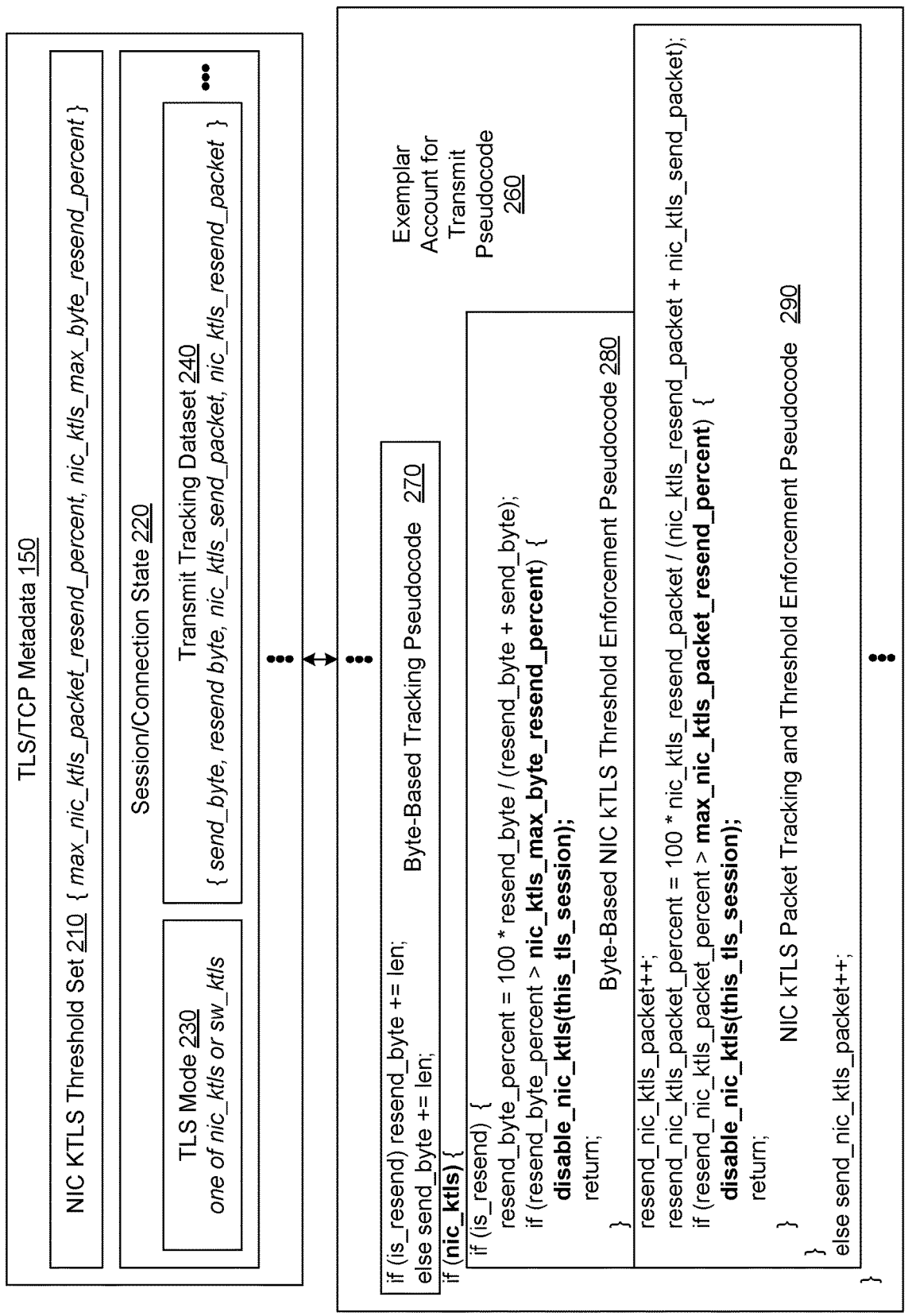
FIG. 2 is an illustration of exemplar pseudocode describing the account for transmit function of FIG. 1, according to various embodiments.

FIG. 2 is an illustration of exemplar pseudocode describing the account for transmit function 144 of FIG. 1, according to various embodiments. More specifically, FIG. 2 depicts exemplar account for transmit pseudocode 260 that is an example of pseudocode describing a portion of the functionality of the account for transmit function 144 of FIG. 1 as implemented in some embodiments. For explanatory purposes, FIG. 2 also depicts a portion of TLS/TCP metadata 150 as implemented in some embodiments. Many modifications and variations of the TLS/TCP metadata 150 and the functionality of the account for transmit function 144 will be apparent to those of ordinary skill in the art without departing from the scope and spirit of the described embodiments.

As shown, in some embodiments, the TLS/TCP metadata 150 includes, without limitation, a NIC kTLS threshold set 210 and a session/connection state 220 for an exemplar TLS session and an associated exemplar TCP connection. As described previously herein in conjunction with FIG. 1, the NIC kTLS threshold set 210 is an example of shared TLS/TCP metadata. As depicted with ellipses, in the same or other embodiments, the TLS/TCP metadata 150 can include, without limitation, any amount and/or types of other shared metadata and/or any number of other session/connection states for any number of other TLS sessions and associated TCP connections.

In some embodiments, the NIC kTLS threshold set 210 includes, without limitation, a configurable NIC kTLS maximum byte re-transmission percentage and a configurable maximum packet re-transmission via NIC kTLS percentage. The NIC kTLS maximum byte re-transmission percentage is a maximum percentage of re-transmitted data bytes of the total number of data bytes either transmitted or re-transmitted within a TLS session that the kernel 130 is to allow when TLS data encryption for the TLS session is offloaded to a NIC. The maximum packet re-transmission via NIC kTLS percentage is a maximum percentage of TCP packets used to re-transmit data within a TLS session via NIC kTLS that the kernel 130 is to allow when TLS data encryption for the TLS session is offloaded to a NIC, For explanatory purposes and as depicted in italics, the NIC kTLS maximum byte re-transmission percentage and the maximum packet re-transmission via NIC kTLS percentage are also denoted herein as nic_ktls_max_byte_resend_percent and max_nic_ktls_packet_resend_percent, respectively.

The kernel 130 and/or any other components of the server device 110 can determine the NIC kTLS threshold set 210 in any technically feasible fashion. For instance, in some embodiments, the NIC kTLS maximum byte re-transmission percentage and the maximum packet re-transmission via NIC kTLS percentage, any amount of other data included in the NIC kTLS threshold set 210, or any combination thereof are set via a system control mechanism that enables users (e.g., administrators) to provide data to the kernel 130. In the same or other embodiments, users can configure the system control mechanism in any technically feasible fashion.

As shown, in some embodiments, the session/connection state 220 includes, without limitation, a TLS mode 230 for the exemplar TLS session and a transmit tracking dataset 240 associated with the exemplar TLS session and/or the exemplar TCP connection. As depicted with ellipses, in the same or other embodiments, the session/connection state 220 can include, without limitation, any amount and/or types of other data associated with the exemplar TLS session and/or the exemplar TCP connection. In some embodiments, the TLS mode 230 can be either a NIC kTLS mode or a software kTLS mode. As depicted in italics, for explanatory purposes, the NIC kTLS mode and the software kTLS mode are also denoted herein as nic_ktls and sw_ktls, respectively.

In some embodiments, the transmit tracking dataset 240 includes, without limitation, any amount and/or types of state data associated with the exemplar TCP connection. In the same or other embodiments, the transmit tracking dataset for each TCP connection includes, without limitation, a total number of data bytes transmitted over the TCP connection, a count of TCP packets used to transmit data over the TCP connection, a total number of data bytes re-transmitted over the TCP connection, and a count of TCP packets used to re-transmit data over the TCP connection. As depicted in italics, for explanatory purposes, the total number of data bytes transmitted over the TCP connection, the count of TCP packets used to transmit data over the TCP connection the total number of data bytes re-transmitted over the TCP connection, and the count of TCP packets used to re-transmit data over the TCP connection are also denoted herein as send_byte, nic_ktls_send_packet, resend byte, and nic_ktls_resend_packet, respectively.

In some embodiments, any number of portions of the TLS/TCP metadata 150, the session/connection state, and the transmit tracking dataset 240 can be stored within and/or distributed across any number and/or types of other data structures and/or components in any technically feasible fashion. For instance, in some embodiments, the transmit tracking dataset 240 is implemented via counters that are stored in a TCP control block (not shown).

In some embodiments, the kernel 130 initializes the TLS mode 230 to NIC kTLS to configure the exemplar TLS session to initially offload TLS data encryption to the NIC 180. The kernel 130 can initialize the transmit tracking dataset 240 in any technically feasible fashion. For each send and each resend over the exemplar TCP connection, the kernel 130 executes the account for transmit pseudocode 260 to update the transmit tracking dataset 240 and to determine whether the exemplar TLS session and/or the exemplar TCP connection has exceeded any threshold included in the NIC kTLS threshold set 210.

In the same or other embodiments, if the kernel 130 determines that the exemplar TLS session and/or the exemplar TCP connection has exceeded any threshold included in the NIC kTLS threshold set 210, the kernel 130 changes the TLS mode 230 to software kTLS. When the TLS mode 230 is software kTLS, the kernel 130 ensures that data is initially transmitted over the exemplar TCP connection in accordance with the software kTLS protocol and that data is re-transmitted over the exemplar TCP connection in accordance with the kTLS protocol with which the data was originally transmitted over the exemplar TCP connection.

For explanatory purposes, the exemplar account for transmit pseudocode 260 is described in the context of the exemplar TLS session and the exemplar TCP connection. As shown, the exemplar account for transmit pseudocode 260 includes, without limitation, byte-based tracking pseudocode 270, byte-based NIC TLS threshold enforcement pseudocode 280, and NIC kTLS packet tracking and threshold enforcement pseudocode 290.

As per the byte-based tracking pseudocode 270, in some embodiments, for each resend over the exemplar TCP connection, the kernel 130 increments resend_byte by a number of data bytes associated with the resend. In the same or other embodiments, for each send over the exemplar TCP connection, the kernel 130 increments send_byte by a number of data bytes associated with the send.

In some embodiments, for each resend over the exemplar TCP connection while the TLS mode 230 is NIC kTLS mode, the kernel 130 performs byte-based NIC TLS threshold enforcement as described in the byte-based NIC TLS threshold enforcement pseudocode 280. As per the byte-based NIC TLS threshold enforcement pseudocode 280, the kernel 130 sets a variable denoted as "resend_byte_percent" equal to 100*resend_byte/(resend_byte+send_byte). If the resend_byte_percent exceeds the nic_ktls_max_byte_resend_percent, then the kernel 130 calls the disable NIC kTLS function 148 to change the TLS mode 230 from NIC kTLS mode to software kTLS mode.

In some embodiments, for each send and each resend over the exemplar TCP connection while the TLS mode 230 is NIC kTLS mode, if the resend_byte_percent does not exceeds the nic_ktls_max_byte_resend_percent then the kernel 130 performs NIC kTLS packet tracking and threshold enforcement as described in the NIC kTLS packet tracking and threshold enforcement pseudocode 290. As per the NIC kTLS packet tracking and threshold enforcement pseudocode 290, in some embodiments, for each send over the exemplar TCP connection, the kernel 130 increments send_nic_ktls_packet by one.

In the same or other embodiments, as per the NIC kTLS packet tracking and threshold enforcement pseudocode 290, for each resend over the exemplar TCP connection, the kernel 130 increments resend_nic_ktls_packet by one and computes a variable denoted as "resend_nic_ktls_packet_percent." More precisely, the kernel 130 sets resend_nic_ktls_packet_percent equal to 100*nic_ktls_resend_packet/(nic_ktls_resend_packet+nic_ktls_send_packet). If the, resend_nic_ktls_packet_percent exceeds max_nic_ktls_packet_resend_percent, then the kernel 130 calls the disable NIC kTLS function 148 to change the TLS mode 230 from NIC kTLS mode to software kTLS mode.

Figure 3:
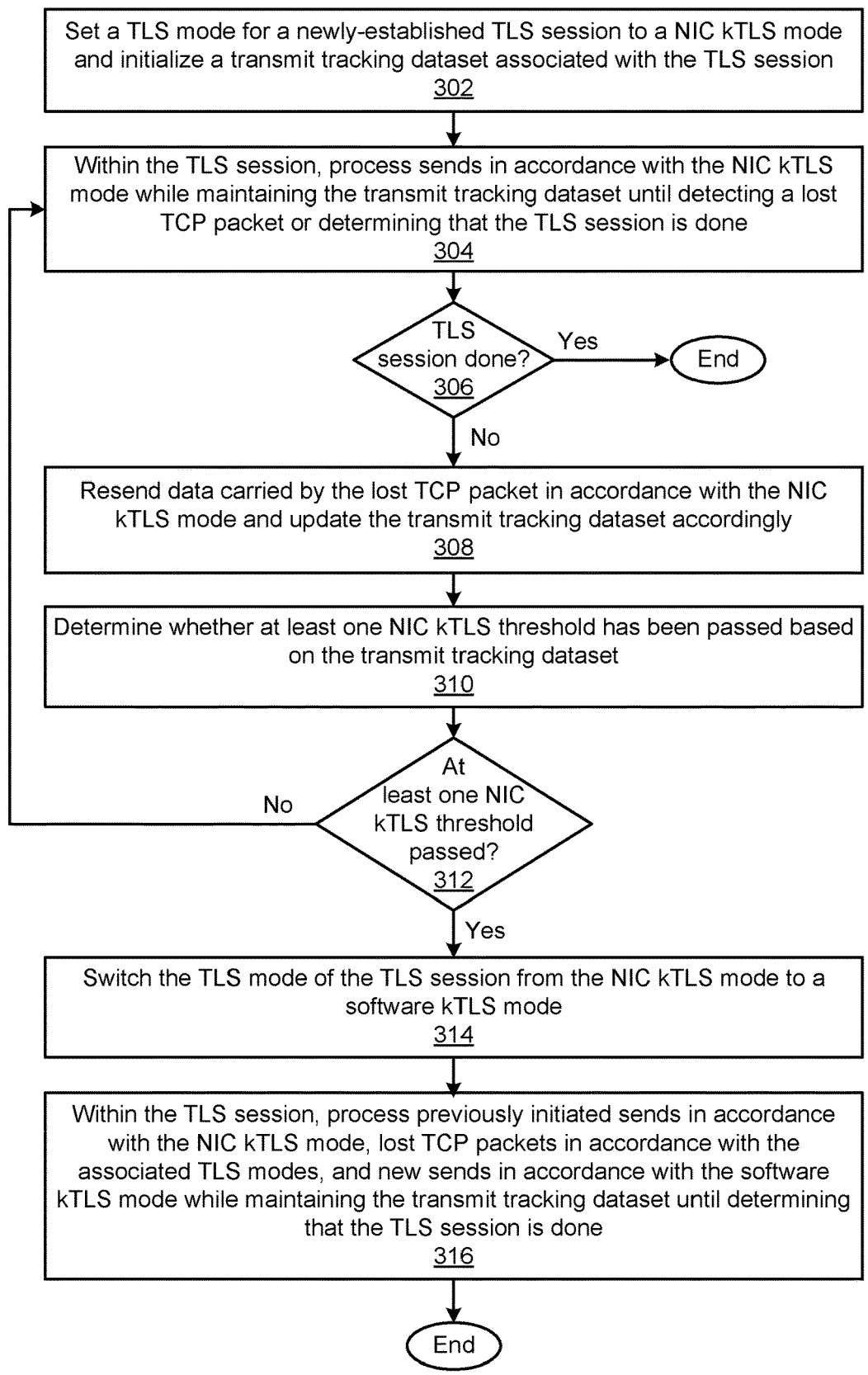
FIG. 3 is a flow diagram of method steps for encrypting data for transmission over a TCP connection, according to various embodiments.

FIG. 3 is a flow diagram of method steps for encrypting data for transmission over a TCP connection, according to various embodiments. Although the method steps are described with reference to the systems of FIGS. 1 and 2, persons skilled in the art will understand that any system configured to implement the method steps, in any order, falls within the scope of the present invention.

As shown, a method 300 begins at step 302, where the kernel 130 sets a TLS mode for a newly-established TLS session to a NIC kTLS mode and initializes a transmit tracking dataset associated with the TLS session. At step 304, within the TLS session, the kernel 130 process sends in accordance with the NIC kTLS mode while maintaining the transmit tracking dataset until detecting a lost TCP packet or the TLS session is done. At step 306, if the server device 110 determines that the TLS session is done, then the method 300 terminates.

If, however, at step 306, the server device 110 determines that the TLS session is not done, then the method 300 proceeds to step 308. At step 308, the server device 110 resends data carried by the lost TCP packet in accordance with the NIC kTLS mode, and the kernel 130 updates the transmit tracking dataset accordingly.

At step 310, the kernel 130 determines whether at least one NIC kTLS threshold has been passed based on the transmit tracking dataset. At step 312, if the kernel 130 determines that none of the NIC kTLS threshold(s) have been passed, then the method 300 returns to step 304, where, within the TLS session, the server device 110 process sends in accordance with the NIC kTLS mode while maintaining the transmit tracking dataset until detecting a lost TCP packet or determining that the TLS session is done.

If, however, at step 312, the kernel 130 determines that at least one NIC kTLS threshold has been passed, then the method 300 proceeds directly to step 314. At step 314, the kernel 130 switches the TLS mode of the TLS session from the NIC kTLS mode to a software kTLS mode. At step 316, within the TLS session, the server device 110 processes previously queued sends in accordance with the NIC kTLS mode, lost TCP packets in accordance with the associated kTLS modes, and new sends in accordance with the software kTLS mode while maintaining the transmit tracking dataset 240 until determining that the TLS session is done. The method 300 then terminates.

Note that for explanatory purposes, method 300 describes the method steps with reference to a single TLS session that enables server application 120 executing on a server device to securely deliver data to a client application executing on a client device over a single TCP connection. As persons skilled in the art will recognize, user space TLS library 122, kernel 130, any number of NIC drivers, and any number of NICs can collaborate to establish any number of TLS sessions that operate over corresponding TCP connections connecting any number of server applications to any number of client applications.

For each TLS session, the kernel 130 initializes a different TLS mode to the NIC kTLS mode, maintains an independent transmit tracking dataset, and independently switches the TLS mode to the software kTLS mode upon detecting that any NIC kTLS threshold has been passed. Accordingly, at any given time, each of the server device 110, the user space TLS library 122, the kernel 130, any number of NIC drivers, and any number of NICs can be associated with zero or more TLS sessions that are in the NIC kTLS mode and zero or more TLS sessions that are in the software kTLS mode.

In sum, the disclosed techniques can be used to mitigate the risk of DoS attacks when implementing NIC kTLS. In some embodiments, a configurable NIC kTLS maximum byte re-transmission percentage and a configurable maximum packet re-transmission via NIC kTLS percentage are set to values that are indicative of a DoS attack that fakes TCP packet loss. The NIC kTLS maximum byte re-transmission percentage and the maximum packet re-transmission via NIC kTLS percentage are two examples of NIC kTLS thresholds. More specifically, the NIC kTLS maximum byte re-transmission percentage and the maximum packet re-transmission via NIC kTLS percentage are two examples of maximum re-transmit thresholds associated with the NIC kTLS mode.

A kernel executing on a processor in a server device initially sets a kTLS mode for a TLS session to a NIC kTLS mode. Within the TLS session, the kernel, a NIC driver, and a NIC enable end-to-end secure delivery of application data from the server device to a client device over an associated TCP connection. While the TLS session is in the NIC kTLS mode, the kernel offloads encryption of data to a NIC that transmits TCP packets encapsulating encrypted data from a server application executing on the server device to a client application executing on the client device over an associated TCP connection. Notably, the kernel automatically executes an "account for transmit" function on every send and every resend within the TLS session. Among many other things, the account for transmit function updates state data for the TCP connection that is stored in a TCP control block and performs any number and/or types of checks and/or operations to enforce any number and/or types of constraints.

To facilitate DoS attack mitigation, the TCP control block for each TCP connection includes, without limitation, counters that store a count of TCP packets used to transmit data over the TCP connection via NIC kTLS, a total number of data bytes transmitted over the TCP connection, a count of TCP packets used to re-transmit data over the TCP connection via NIC kTLS, and a total number of data bytes re-transmitted over the TCP connection, For each send associated with the TCP connection, the account for transmit function automatically updates the counter storing the total number of data bytes transmitted over the TCP connection. For each resend associated with the TCP connection, the account for transmit function automatically updates the counter storing the total number of data bytes re-transmitted over the TCP connection. For each send via NIC kTLS that is associated with the TCP connection, the account for transmit function automatically updates the counter storing the count of TCP packets used to transmit data over the TCP connection via NIC kTLS.

For each resend via NIC kTLS that is associated with the TCP connection, the account for transmit function automatically updates the counter storing the count of TCP packets used to re-transmit data over the TCP connection via NIC kTLS, computes a byte re-transmission percentage, and computes a packet re-transmission via NIC kTLS percentage. If the byte re-transmission percentage exceeds the NIC kTLS maximum byte re-transmission percentage and/or the packet re-transmission via NIC kTLS percentage exceeds the maximum packet re-transmission via NIC kTLS percentage, then the account for transmit function sets the TLS mode for the TLS session to a software kTLS mode instead of the NIC kTLS mode. After the kernel switches the TLS session from the NIC kTLS mode to the software kTLS mode, the NIC performs TLS data encryption for any previously initiated sends and any associated resends, while the kernel performs TLS data encryption for any newly initiated sends and any associated resends.

At least one technical advantage of the disclosed techniques relative to the prior art is that, with the disclosed techniques, TLS records can be generated efficiently when transmitting TCP packets over a TCP connection while also mitigating the risk of DoS attacks. In this regard, because TLS data encryption is offloaded from software to a NIC, unless a maximum re-transmit threshold is exceeded, the amount of processing resources and system memory bandwidth consumed using the disclosed techniques can be reduced relative to software kTLS. Further, because TLS data encryption is automatically moved from the NIC to software when a maximum re-transmit threshold is exceeded, the overall risk posed by DoS attacks is reduced relative to NIC kTLS. These technical advantages provide one or more technological advancements over prior art approaches.

1. In some embodiments, a computer-implemented method for encrypting data for transmission comprises causing a network interface controller (NIC) to encrypt first data to generate a first transmission control protocol (TCP) packet in accordance with a hardware-based transport layer security (TLS) offload mode; computing a first re-transmission statistic in response to the first TCP packet failing to reach a first device over a first TCP connection; assigning the first TCP connection to a software-based TLS offload mode instead of the hardware-based TLS offload mode based on the first re-transmission statistic; encrypting second data to generate a second TCP packet in accordance with the software-based TLS offload mode; and causing the NIC to transmit the second TCP packet to the first device over the first TCP connection.

2. The computer-implemented method of clause 1, wherein computing the first re-transmission statistic comprises computing at least one of a ratio or a percentage based on a total number of data bytes transmitted over the first TCP connection and a total number of data bytes re-transmitted over the first TCP connection.

3. The computer-implemented method of clauses 1 or 2, wherein the first re-transmission statistic is computed based on a count of TCP packets used to transmit data over the first TCP connection.

4. The computer-implemented method of any of clauses 1-3, wherein assigning the first TCP connection to the software-based TLS offload mode instead of the hardware-based TLS offload mode comprises comparing the first re-transmission statistic to a re-transmission threshold and determining that the hardware-based TLS offload mode is to be disabled for the first TCP connection.

5. The computer-implemented method of any of clauses 1-4, further comprising initially assigning the first TCP connection to the hardware-based TLS offload mode.

6. The computer-implemented method of any of clauses 1-5, further comprising causing the NIC to re-encrypt the first data to generate a third TCP packet in accordance with the hardware-based TLS offload mode in response to the first TCP packet failing to reach the first device over the first TCP connection.

7. The computer-implemented method of any of clauses 1-6, wherein one or more TCP packets are transmitted in accordance with the hardware-based TLS offload mode that is assigned to a second TCP connection while the first TCP connection is assigned to the software-based TLS offload mode.

8. The computer-implemented method of any of clauses 1-7, wherein assigning the first TCP connection to the software-based TLS offload mode instead of the hardware-based TLS offload mode comprises assigning a TLS session associated with a transmit side of the first TCP connection to the software-based TLS offload mode instead of the hardware-based TLS offload mode.

9. The computer-implemented method of any of clauses 1-8, further comprising, prior to computing the first re-transmission statistic, updating at least one of a count of TCP packets used to transmit data over the first TCP connection or a total number of data bytes transmitted over the first TCP connection based on the first TCP packet.

10. The computer-implemented method of any of clauses 1-9, further comprising, prior to using the NIC to encrypt first data to generate the first TCP packet, determining that a TLS session associated with a transmit side of the first TCP connection is assigned to the hardware-based TLS offload mode.

11. In some embodiments, one or more non-transitory computer readable media include instructions that, when executed by one or more processors, cause the one or more processors to encrypt data for transmission by performing the steps of causing a network interface controller (NIC) to encrypt first data to generate a first transmission control protocol (TCP) packet in accordance with a hardware-based transport layer security (TLS) offload mode; computing a first re-transmission statistic in response to the first TCP packet failing to reach a first device over a first TCP connection; assigning the first TCP connection to a software-based TLS offload mode instead of the hardware-based TLS offload mode based on the first re-transmission statistic; encrypting second data to generate a second TCP packet in accordance with the software-based TLS offload mode; and causing the NIC to transmit the second TCP packet to the first device over the first TCP connection.

12. The one or more non-transitory computer readable media of clause 11, wherein the first re-transmission statistic is computed based on a total number of data bytes transmitted over the first TCP connection.

13. The one or more non-transitory computer readable media of clauses 11 or 12, wherein computing the first re-transmission statistic comprises computing a ratio or a percentage based on a first count of TCP packets used to transmit data over the first TCP connection and a second count of TCP packets used to re-transmit data over the first TCP connection.

14. The one or more non-transitory computer readable media of any of clauses 11-13, wherein assigning the first TCP connection to the software-based TLS offload mode instead of the hardware-based TLS offload mode comprises comparing the first re-transmission statistic to a re-transmission threshold and determining that the hardware-based TLS offload mode is to be disabled for the first TCP connection.

15. The one or more non-transitory computer readable media of any of clauses 11-14, further comprising initially assigning the first TCP connection to the hardware-based TLS offload mode.

16. The one or more non-transitory computer readable media of any of clauses 11-15, further comprising causing the NIC to re-encrypt the first data to generate a third TCP packet in accordance with the hardware-based TLS offload mode in response to the first TCP packet failing to reach the first device over the first TCP connection.

17. The one or more non-transitory computer readable media of any of clauses 11-16, wherein one or more TCP packets are transmitted in accordance with the hardware-based TLS offload mode that is assigned to a second TCP connection while the first TCP connection is assigned to the software-based TLS offload mode.

18. The one or more non-transitory computer readable media of any of clauses 11-17, further comprising, prior to computing the first re-transmission statistic, updating at least one of a count of TCP packets used to re-transmit data over the first TCP connection or a total number of data bytes re-transmitted over the first TCP connection to reflect a re-transmission of encrypted data to the first device over the first TCP connection.

19. The one or more non-transitory computer readable media of any of clauses 11-18, further comprising, prior to using the NIC to encrypt first data to generate the first TCP packet, determining that a TLS session associated with a transmit side of the first TCP connection is assigned to the hardware-based TLS offload mode.

20. In some embodiments, a system comprises one or more memories storing instructions and one or more processors coupled to the one or more memories that, when executing the instructions, perform the steps of causing a network interface controller (NIC) to encrypt first data to generate a first transmission control protocol (TCP) packet in accordance with a hardware-based transport layer security (TLS) offload mode; computing a first re-transmission statistic in response to the first TCP packet failing to reach a first device over a first TCP connection; assigning the first TCP connection to a software-based TLS offload mode instead of the hardware-based TLS offload mode based on the first re-transmission statistic; encrypting second data to generate a second TCP packet in accordance with the software-based TLS offload mode; and causing the NIC to transmit the second TCP packet to the first device over the first TCP connection.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine.

The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for encrypting data for transmission, the method comprising:
    causing a network interface controller (NIC) to encrypt first data to generate a first transmission control protocol (TCP) packet in accordance with a hardware-based transport layer security (TLS) offload mode;
    computing a first re-transmission statistic in response to the first TCP packet failing to reach a first device over a first TCP connection;
    in response to the first re-transmission statistic meeting a first criterion, assigning the first TCP connection to a software-based TLS offload mode instead of the hardware-based TLS offload mode;
    encrypting second data to generate a second TCP packet in accordance with the software-based TLS offload mode; and
    causing the NIC to transmit the second TCP packet to the first device over the first TCP connection.

2. The computer-implemented method of claim 1, wherein computing the first re-transmission statistic comprises computing at least one of a ratio or a percentage based on a total number of data bytes transmitted over the first TCP connection and a total number of data bytes re-transmitted over the first TCP connection.

3. The computer-implemented method of claim 1, wherein the first re-transmission statistic is computed based on a count of TCP packets used to transmit data over the first TCP connection.

4. The computer-implemented method of claim 1, wherein assigning the first TCP connection to the software-based TLS offload mode instead of the hardware-based TLS offload mode comprises comparing the first re-transmission statistic to a re-transmission threshold and determining that the hardware-based TLS offload mode is to be disabled for the first TCP connection.

5. The computer-implemented method of claim 1, further comprising initially assigning the first TCP connection to the hardware-based TLS offload mode.

6. The computer-implemented method of claim 1, further comprising causing the NIC to re-encrypt the first data to generate a third TCP packet in accordance with the hardware-based TLS offload mode in response to the first TCP packet failing to reach the first device over the first TCP connection.

7. The computer-implemented method of claim 1, wherein one or more TCP packets are transmitted in accordance with the hardware-based TLS offload mode that is assigned to a second TCP connection while the first TCP connection is assigned to the software-based TLS offload mode.

8. The computer-implemented method of claim 1, wherein assigning the first TCP connection to the software-based TLS offload mode instead of the hardware-based TLS offload mode comprises assigning a TLS session associated with a transmit side of the first TCP connection to the software-based TLS offload mode instead of the hardware-based TLS offload mode.

9. The computer-implemented method of claim 1, further comprising, prior to computing the first re-transmission statistic, updating at least one of a count of TCP packets used to transmit data over the first TCP connection or a total number of data bytes transmitted over the first TCP connection based on the first TCP packet.

10. The computer-implemented method of claim 1, further comprising, prior to using the NIC to encrypt first data to generate the first TCP packet, determining that a TLS session associated with a transmit side of the first TCP connection is assigned to the hardware-based TLS offload mode.

11. One or more non-transitory computer readable media including instructions that, when executed by one or more processors, cause the one or more processors to encrypt data for transmission by performing the steps of:
causing a network interface controller (NIC) to encrypt first data to generate a first transmission control protocol (TCP) packet in accordance with a hardware-based transport layer security (TLS) offload mode;
computing a first re-transmission statistic in response to the first TCP packet failing to reach a first device over a first TCP connection;
in response to the first re-transmission statistic meeting a first criterion, assigning the first TCP connection to a software-based TLS offload mode instead of the hardware-based TLS offload mode;
encrypting second data to generate a second TCP packet in accordance with the software-based TLS offload mode; and
causing the NIC to transmit the second TCP packet to the first device over the first TCP connection.

12. The one or more non-transitory computer readable media of claim 11, wherein the first re-transmission statistic is computed based on a total number of data bytes transmitted over the first TCP connection.

13. The one or more non-transitory computer readable media of claim 11, wherein computing the first re-transmission statistic comprises computing a ratio or a percentage based on a first count of TCP packets used to transmit data over the first TCP connection and a second count of TCP packets used to re-transmit data over the first TCP connection.

14. The one or more non-transitory computer readable media of claim 11, wherein assigning the first TCP connection to the software-based TLS offload mode instead of the hardware-based TLS offload mode comprises comparing the first re-transmission statistic to a re-transmission threshold and determining that the hardware-based TLS offload mode is to be disabled for the first TCP connection.

15. The one or more non-transitory computer readable media of claim 11, further comprising initially assigning the first TCP connection to the hardware-based TLS offload mode.

16. The one or more non-transitory computer readable media of claim 11, further comprising causing the NIC to re-encrypt the first data to generate a third TCP packet in accordance with the hardware-based TLS offload mode in response to the first TCP packet failing to reach the first device over the first TCP connection.

17. The one or more non-transitory computer readable media of claim 11, wherein one or more TCP packets are transmitted in accordance with the hardware-based TLS offload mode that is assigned to a second TCP connection while the first TCP connection is assigned to the software-based TLS offload mode.

18. The one or more non-transitory computer readable media of claim 11, further comprising, prior to computing the first re-transmission statistic, updating at least one of a count of TCP packets used to re-transmit data over the first TCP connection or a total number of data bytes re-transmitted over the first TCP connection to reflect a re-transmission of encrypted data to the first device over the first TCP connection.

19. The one or more non-transitory computer readable media of claim 11, further comprising, prior to using the NIC to encrypt first data to generate the first TCP packet, determining that a TLS session associated with a transmit side of the first TCP connection is assigned to the hardware-based TLS offload mode.

20. A system comprising:
one or more memories storing instructions; and
one or more processors coupled to the one or more memories that, when executing the instructions, perform the steps of:
causing a network interface controller (NIC) to encrypt first data to generate a first transmission control protocol (TCP) packet in accordance with a hardware-based transport layer security (TLS) offload mode;
computing a first re-transmission statistic in response to the first TCP packet failing to reach a first device over a first TCP connection
in response to the first re-transmission statistic meeting a first criterion, assigning the first TCP connection to a software-based TLS offload mode instead of the hardware-based TLS offload mode;
encrypting second data to generate a second TCP packet in accordance with the software-based TLS offload mode; and
causing the NIC to transmit the second TCP packet to the first device over the first TCP connection.

* * * * *

UNITED STATES PATENT AND TRADEMARK OFFICE
CERTIFICATE OF CORRECTION

| | | |
|---|---|---|
| PATENT NO. | : 12,375,462 B2 | Page 1 of 1 |
| APPLICATION NO. | : 17/878757 | |
| DATED | : July 29, 2025 | |
| INVENTOR(S) | : Andrew John Gallatin | |

It is certified that error appears in the above-identified patent and that said Letters Patent is hereby corrected as shown below:

On the Title Page

Item (54) and in the Specification Column 1, Line 1, delete:
"TECHNIQUES FOR MITIGATING NIC kTLS DENIAL-OF-SERVICE ATTACKS" and
insert --TECHNIQUES FOR MITIGATING NIC KTLS DENIAL-OF-SERVICE ATTACKS--.

Signed and Sealed this
Ninth Day of September, 2025

Coke Morgan Stewart
*Acting Director of the United States Patent and Trademark Office*